US007622427B2

(12) United States Patent
Sau et al.

(10) Patent No.: US 7,622,427 B2
(45) Date of Patent: Nov. 24, 2009

(54) ETHOXYLATED RAW COTTON LINTERS FOR COMPLETION AND WORKOVER FLUIDS

(75) Inventors: Arjun C. Sau, Newark, DE (US); Mohand Melbouci, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 169 days.

(21) Appl. No.: 11/709,183

(22) Filed: Feb. 21, 2007

(65) Prior Publication Data
US 2007/0197399 A1    Aug. 23, 2007

Related U.S. Application Data

(63) Continuation of application No. 60/776,040, filed on Feb. 23, 2006.

(51) Int. Cl.
*C09K 8/035* (2006.01)
*C09K 8/08* (2006.01)
*C09K 8/20* (2006.01)
*C09K 8/24* (2006.01)
*E21B 43/00* (2006.01)

(52) U.S. Cl. .................. 507/204; 507/106; 507/112; 507/113; 507/114; 507/120; 507/129; 507/134; 507/136; 507/141; 507/143; 507/206; 507/211; 507/213; 507/214; 507/218; 507/224; 507/225; 507/241; 507/259; 507/261; 507/269; 507/276

(58) Field of Classification Search .................. None
See application file for complete search history.

(56) References Cited

U.S. PATENT DOCUMENTS 2,941,892 A * 6/1960 Simon, Jr. .............. 106/166.52
3,031,320 A * 4/1962 Baer et al. .............. 106/166.5
4,579,942 A * 4/1986 Brode et al. .................. 536/84
5,076,944 A * 12/1991 Cowan et al. .............. 507/104
2005/0056424 A1* 3/2005 Hanes et al. .............. 166/279

(Continued)

FOREIGN PATENT DOCUMENTS

DE        40 34 709 A1    5/1990

OTHER PUBLICATIONS

Derwent Abstract of DE 4034709 A, entitled "Cellulose ether products with high degree of polymerization prepared by etherifying raw cotton llinters . . . ", Nov. 1, 1990.*
Derwent Abstract of DE 4034709A, entitled "Cellulose ether products with high degree of polymerization prepared by etherifying raw cotton linters . . . ", Nov. 1, 1990.

*Primary Examiner*—James Seidleck
*Assistant Examiner*—John J Figueroa
(74) *Attorney, Agent, or Firm*—Robert O'Flynn O'Brien; Joanne Mary Fobare Rossi

(57) ABSTRACT

A completion and workover fluid composition comprising, water and at least one rheology modifier and/or fluid loss control agent, and at least one other ingredient selected from the group consisting of inorganic salts, shale inhibitors, corrosion inhibitor, biocide, defoamers and finely divided solids particles (e.g., bentonite, attapulgite, sepiolite, calcium carbonate, etc.), depending upon the desired attributes, wherein the rheology modifier and/or the fluid loss control agent is an ethoxylated raw cotton linters or a modified ethoxylated raw cotton linters. The ethoxylated raw cotton linters provides comparable or better rheology and viscosity properties compared to high molecular weight commercial HECs made from purified cotton linters. These ethoxylated raw cotton linters derivatives are suitable for applications in oil-well servicing fluids, particularly to enhance functional properties of completion and workover fluids used during oil-well drilling operations.

20 Claims, 4 Drawing Sheets

U.S. PATENT DOCUMENTS

2005/0228174 A1* 10/2005 Gillette et al. ................ 536/86
2006/0019834 A1* 1/2006 Melbouci et al. ............ 507/100
2006/0199742 A1* 9/2006 Arisz et al. ................ 507/114
2007/0105985 A1* 5/2007 Gillette et al. ................ 524/34

* cited by examiner

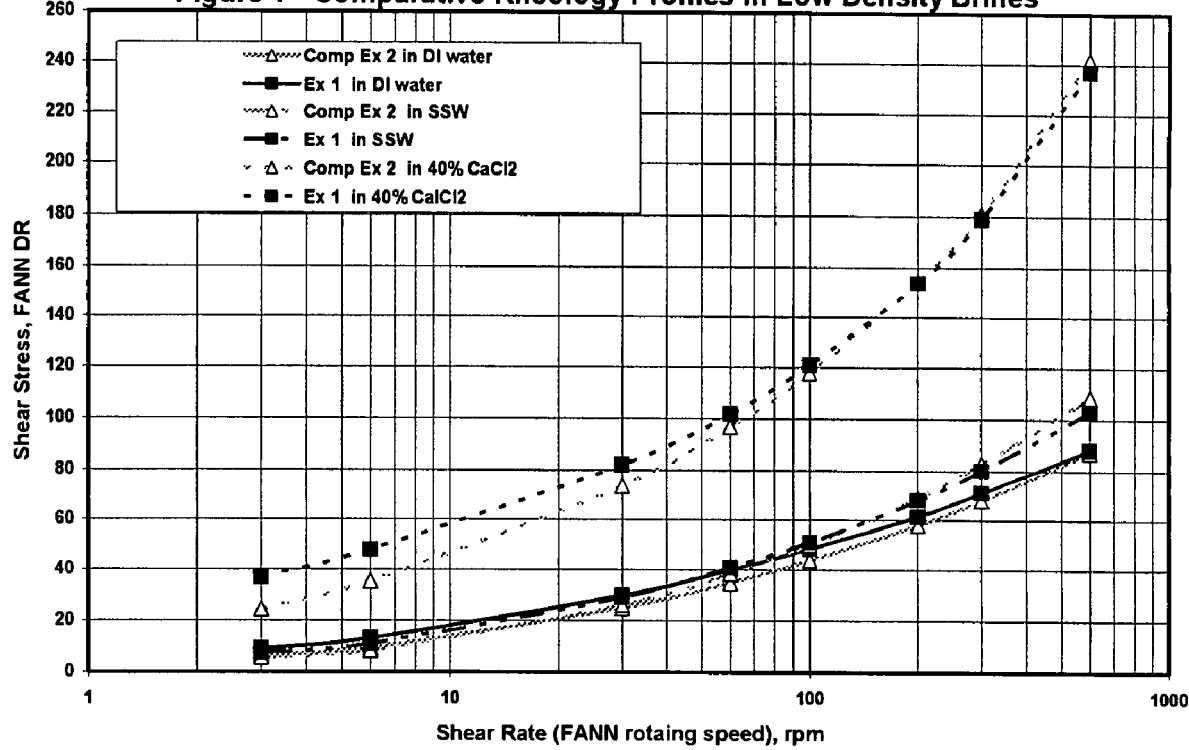

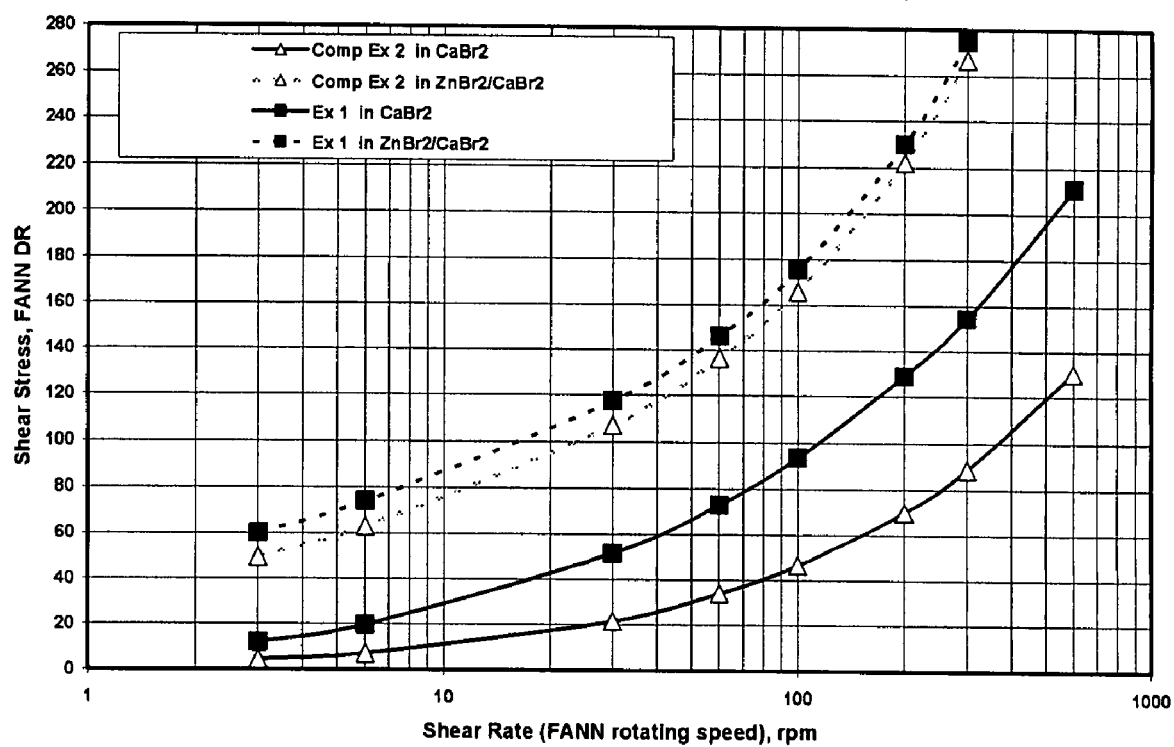
Figure 2 - Comparative Rheology Profiles in High Density Brines

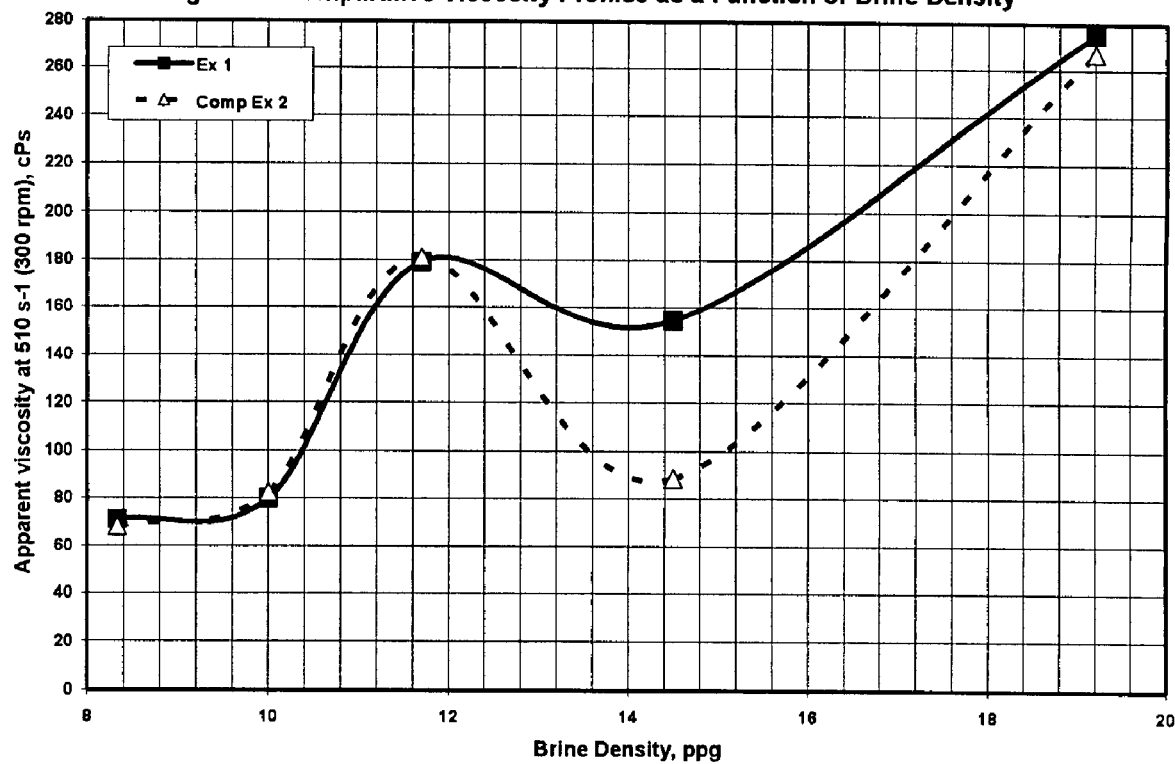

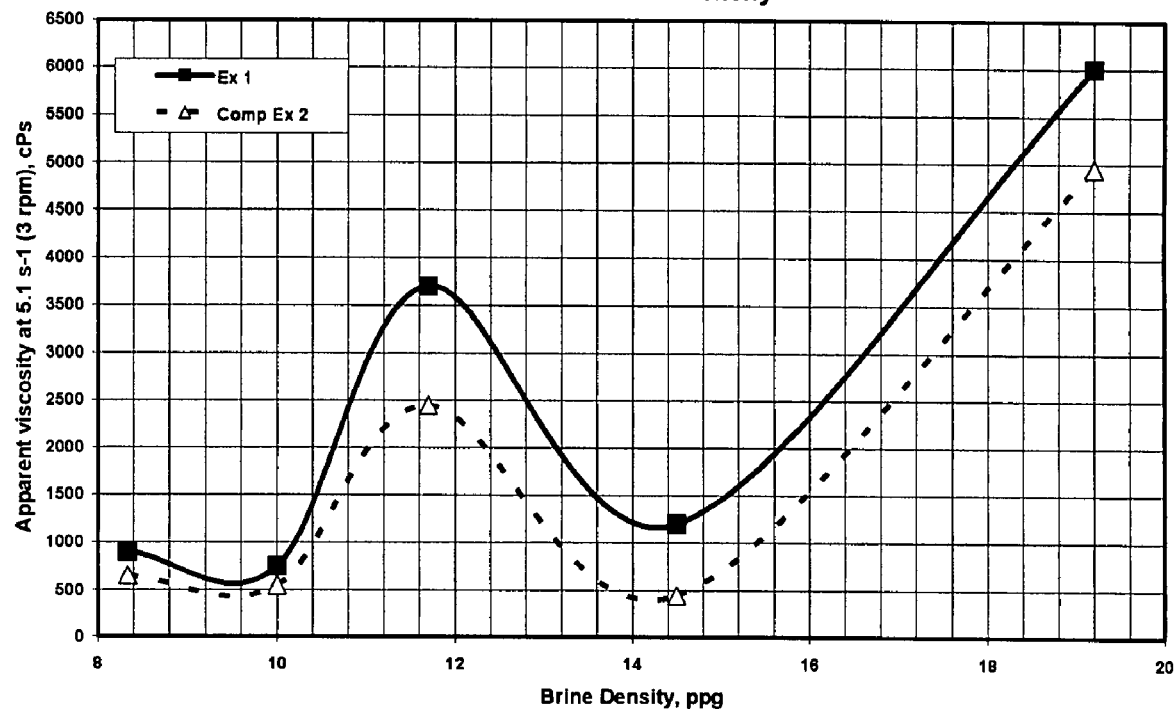
Figure 4 - Comparative Low-Shear Viscosity Profiles as a Function of Brine Density

ETHOXYLATED RAW COTTON LINTERS FOR COMPLETION AND WORKOVER FLUIDS

RELATED APPLICATIONS

This application claims the benefit of U.S. Provisional Application Ser. No. 60/776,040, filed on Feb. 23, 2006, which is incorporated herein by reference in its entirety.

FIELD OF THE INVENTION

This invention relates to the use of non-ionic polymers in oil-well servicing fluids. More specifically, this invention relates to the use of ethoxylated raw cotton linters as an effective additive to control the rheology and/or reduce fluid loss of completion and workover fluids.

BACKGROUND OF THE INVENTION

Completion fluids are composed of a variety of brines of different salinity characterized by a density ranging from 8.5 pounds per gallon (ppg) for seawater to 19.2 ppg for heavy brines containing zinc bromide and calcium bromide. Currently, high viscosity grade hydroxyethylcelluloses (HECs), such as Natrosole HEC 250 HHR-P, Natrosol® HEC HI-VIS and Natrosol® HEC 210 HHW (available from Hercules Incorporated) are used as thickeners for brines having density from 9-13 ppg. These Natrosol® HECs are presently manufactured using purified cotton linters and are characterized by a 1% aqueous solution having a Brookfield viscosity exceeding 5,000 cPs. For lower density, non-calcium based brines, xanthan gum is the polymer of choice for its high carrying capacity and gel strength Currently, there is no efficient viscosifier for heavy brines with a density ranging from 14 ppg ($CaBr_2$) to 19.2 ppg ($ZnBr_2/CaBr_2$). These brines have a very low level of free water, and therefore, do not promote optimum hydration of standard HECs. As the salt content in the brine solution is increased, the hydration rate of the HEC dramatically decreases, and it takes longer time to build the desired viscosity. Furthermore, these brines are characterized by a very low pH (pH<1 for $ZnBr_2/CaBr_2$).

Obviously, there is a need to develop an HEC or an analogous polymer that has very high solution viscosity and dissolves rapidly in high density brines. While technically it is possible to increase the viscosity of the HECs by reducing their average oxyethylene molar substitution (MS), the manufacture of such low MS HECs is difficult.

SUMMARY OF THE INVENTION

The present invention is directed to a completion and workover fluid composition. The completion and workover fluid composition comprises water and at least one rheology modifier and/or fluid loss control agent, and at least one other ingredient selected from the group consisting of polymeric additive, inorganic salts, shale stabilizers, corrosion inhibitors, weighting agents, and finely divided solid particles (e.g., bentonite, attapulgite, sepiolite, calcium carbonate, etc.), the selection of which is dependent upon the desired attributes of the completion and workover fluids composition. The rheology modifier and/or the fluid loss control agent is an ethoxylated raw cotton linters (EO-RCL). The EO-RCL of use in the completion and workover fluids compositions of the present invention may be an unmodified EO-RCL or a modified EO-RCL. The EO-RCL is made by grafting ethylene oxide (EO) onto RCL. Modified EO-RCLs contain an additional substituent such as carboxymethyl groups and/or hydrocarbyl groups containing 1-30 carbon atoms. The EO-RCLs provide better viscosifying properties and rheology than the HECs made from purified cotton linters. The EO-RCLs provide improved functional properties in completion and workover fluids.

BRIEF DESCRIPTION OF THE FIGURES

FIG. 1 is a line graph depicting the rheological profiles of a fluid of Example 1 and a fluid containing a currently available high viscosity grade hydroxyethylcellulose (Comparative Example 2) in various low density brines.

FIG. 2 is a line graph depicting the rheological profiles of a fluid of Example 1 and a fluid containing a currently available high viscosity grade hydroxyethylcellulose (Comparative Example 2) in various high density brines.

FIG. 3 is a line graph depicting the viscosity profiles of a fluid of Example 1 and a fluid containing a currently available high viscosity grade hydroxyethylcellulose (Comparative Example 2) at a high sheer rate of 510 $s^{-1}$.

FIG. 4 is a line graph depicting the viscosity profiles of a fluid of Example 1 and a fluid containing a currently available high viscosity grade hydroxyethylcellulose (Comparative Example 2) at a low sheer rate of 5.1 $s^{-1}$.

DETAILED DESCRIPTION OF THE INVENTION

Raw cotton linters ("RCL") are an excellent source of high molecular weight cellulose. Raw cotton linters, also commonly referred to as "linters", are short fiber residues which are left on the cottonseed after the longer staple ("lint") fibers are removed by ginning and which have not been subjected to chemical cleaning steps which are typically performed to yield high purity furnish. Linters are shorter, thicker, and more colored fibers than lint. They, also, adhere more strongly to the cotton-seed relative to lint. Raw cotton linters are removed from cottonseeds using a number of technologies including linter saws and abrasive grinding methods, both of which yield suitable materials. The amount of hemicellulose, lignin or colored impurities and foreign matter in the various types of raw cotton linters increases with the number of passes or "cuts" used in removing the linter from the cottonseed. The first-cut linters typically contain the least amount of impurities and foreign matter and subsequent cuts contain more impurities and foreign matter. Typically, the cellulose content of RCL is about 69-78 wt % as measured by the American Oil Chemists' Society (AOCS) "bB 3-47: Cellulose Yield Pressure-Cook Method". The balance of noncellulosic materials found in the RCL consists primarily of seed hulls, dirt, field trash, lignin, hemicellulose, wax, fat, protein, moisture and traces of other organic impurities.

The ether derivatives of RCL may be produced by processes known in the art such as those disclosed in German Patent Application No. 4,034,709 A1 which describes the preparation of high molecular weight methylcellulose, ethylcellulose and hydroxyalkyl alkyl celluloses from RCL, or U.S. Pat. No. 5,028,342 which describes the use of a mixture of 20 to 80% by weight of a crude (technical grade) carboxymethyl cellulose obtained from RCL and/or wood cellulose by a slurry process and 20 to 80% of a polycarboxylic acid in making drilling fluids.

One process for producing EO-RCL is more fully described in US Patent Application 20050228174 (U.S. Ser. No. 10/822, 926) to Gillette, et al. which is incorporated herein by reference in its entirety. In this patent, a process is disclosed for making an EO-RCL using RCL as a starting material includes a) treating the RCL with a base in a slurry or high solids process at a cellulose concentration of greater than 9 wt % to form an activated cellulose slurry, b) reacting the activated cellulose slurry with an etherifying agent (ethylene oxide) to form an EO-RCL, and c) recovering the EO-RCL.

Alternatively, the order of treatment of the RCL with a base solution (step a) and etherifying agent (step b) can be reversed. It is also possible to perform steps a) and b) simultaneously.

In this process for preparing ether derivatives, the base can be either organic or inorganic or mixtures thereof. The inorganic bases include sodium hydroxide, potassium hydroxide, calcium hydroxide, barium hydroxide, ammonium hydroxide, lithium hydroxide, and mixtures thereof. The organic bases must be strong and include, but are not limited to, amines and quaternary ammonium hydroxides.

In the preparation of the ether derivatives, the etherifying agent includes alkyl halides (e.g., methyl and ethyl chloride), alkenyl halides (e.g., ethylene and propylene halide), alkylene oxides (e.g. ethylene oxide, propylene oxide, and butylene oxide), alkyl glycidyl ethers, metal salts of alpha-halogenoalkanoates, vinyl sulfonates, and mixtures thereof. Other etherifying agents are monochloroacetic acid and salts thereof, butyl glycidyl ether, and glycidyl silane (e.g., 3-glycidoxypropyltrimeth-oxysilane and 3-glycidoxypropylmethyldimethoxysilane). For use in the present invention, the preferred ether derivative is EO-RCL.

In US Patent Application 20050228174, an example is provided which sets forth a process for producing EO-RCL is described as follows:

To a Chemco reactor containing a mixture of t-butyl alcohol (611.2 g), isopropanol (28.8 g), acetone (21.6 g), and water (59.07 g) were charged cut second-cut raw cotton linters (80 g on a dry basis). After sealing the reactor, the atmosphere in the reactor was rendered inert by five cycles of evacuation and nitrogen purging. Then, under agitation, 50% caustic solution (44.8 g) was added slowly to the raw cotton linters slurry. The resulting slurry was mixed at 20° C. for 45 minutes and then ethylene oxide (76 g) was added. The resulting mixture was heated at 55° C. for 25 minutes and then at 95° C. for 30 minutes. Following this, the reaction mixture was cooled to 50° C. and treated with 70% nitric acid (50.4 g). The reaction mixture was subsequently cooled to room temperature and filtered under vacuum. The residue was washed three times with 80:20 (w/w) acetone/water mixture and the purified polymer was dehydrated with acetone. The dehydrated polymer was dried in a fluid bed dryer at 70° C. for 0.5 hour.

The hydroxyethyl molar substitution (MS), which is defined as the average number of moles of ethylene oxide grafted per mole of anhydroglucose unit of the cellulose, of the product was 2.67. The 1% aqueous solution Brookfield viscosity of the EO-RCL was 5620 cPs at 30 rpm at 25° C.

To practice the present invention, EO-RCL can be made from "as supplied" RCL, such as first-cut, second-cut, third-cut and "mill run" RCL. If needed, seed hulls and other impurities that are physically held to the fibers could be substantially removed by mechanical means, such as sieving and centrifugation or a combination thereof prior to ethoxylation. The separation of impurities from RCL can be done in the dry or wet condition.

To prepare the EO-RCL, the RCL can be used "as is" or pulverized or comminuted to shorten the fiber length. The pulverization can be carried out separately or it can be done simultaneously as the RCL is being treated with the base and/or the ethoxylating agent. It is important that no substantial molecular degradation of the polymeric species present in RCL occurs during the pulverization step. To prevent this from happening, the pulverization should be conducted in an inert atmosphere, such as in nitrogen, and at low temperatures.

It has been surprising to find that EO-RCLs are efficient thickeners of completion and workover fluids in conjunction with a wide range of brines. Particularly, they provide more efficient thickening capacity in high density brines relative to existing HECs To practice the utilization of the EO-RCL in completion and workover fluids as a thickener and/or fluid loss control agent, the oxyethylene molar substitution (MS) of the EO-RCL should have a lower limit of about 0.5, preferably a lower limit of about 1.5, more preferably a lower limit of about 1.8. To practice the utilization of the EO-RCL in completion and workover fluids as a thickener and/or fluid loss control agent, the oxyethylene MS of the EO-RCL should have an upper limit of about 3.5, more preferably an upper limit of about 2.5, still more preferably an upper limit of about 2.2. The oxyethylene MS of the EO-RCL should be in a range of from about 0.5 to about 3.5, preferably, the MS should be in a range of from about 1.5 to 2.5 and most preferably the MS should be in a range of from about 1.8 to 2.2.

The EO-RCL can be used as an additive in completion and workover fluids with or without purification. The term "purification" is defined as the removal of the low molecular weight by-products formed during the ethoxylation of the RCL. These by-products can be removed partially or completely. The use level of the EO-RCL in the drilling fluid will be dictated by the purity of the EO-RCL. The purer the EO-RCL the lesser the amount of EO-RCL that needs to be used in the completion and workover fluids.

To meet the desired application properties, such as rheology and/or fluid loss control of various types of completion and workover fluids, the MS and molecular weight of the EO-RCL could be tailored. The molecular weight of the EO-RCL can be lowered by treating the EO-RCL with degradation agents, such as an acid, a mixture of caustic and oxygen, peroxides, hypochlorites, chlorites, cellulolytic enzymes or radiation. The molecular degradation of EO-RCL can be carried out in situ or after its isolation in a slurry process or solution.

The completion and workover fluid compositions of the present invention comprising EO-RCL may also contain other polymeric additives which are used in completion and workover fluid compositions. These other polymeric additives may be selected from the group consisting of starch and its derivatives, guar gum and its derivatives, xanthan gum, welan gum, diutan gum, cellulose ethers, polyacrylates, polyacrylamides and mixtures thereof.

The completion and workover fluid compositions of the present invention comprising EO-RCL may also contain inorganic salts selected from the group consisting of calcium carbonate, calcium chloride, potassium chloride, sodium chloride, magnesium chloride, sodium bromide, potassium bromide, calcium bromide, zinc bromide, sodium formate, potassium formate, cesium formate and mixtures thereof.

The completion and workover fluid compositions of the present invention comprising EO-RCL may also contain shale stabilizers or corrosion inhibitors. These shale stabilizers or corrosion inhibitors may be selected from the group consisting of partially hydrolyzed polyacrylamides (PHPA), potassium chloride, potassium acetate, potassium carbonate, potassium hydroxide, sulfonated asphalt, blown asphalt, gilsonite, polyglycols, polyamino acids, surfactants, cationic polymers, mixed metal hydroxides (MMH), and mixtures thereof.

The completion and workover fluid compositions of the present invention comprising EO-RCL may also contain weighting agents. These weighting agents may be selected from the group consisting of barite, hematite, manganese oxide, sized calcium carbonate made from ground limestone or marble, and mixtures thereof.

The completion and workover fluid compositions of the present invention comprising EO-RCL may also contain finely divided clay particles. These finely divided clay particles may be selected from the group consisting of bentonite, attapulgite, sepiolite, saponite, and mixtures thereof.

The completion and workover fluid compositions of the present invention comprising EO-RCL may also contain a lubricant. This lubricant may be selected from the group consisting of glycol, asphalt, and mixtures thereof.

The completion and workover fluid compositions of the present invention comprising EO-RCL may also contain a biocide and/or defoamer.

The following examples illustrate the usefulness and applicability of EO-RCL in brines used as clear, solids-free completion and workover fluids. The examples are merely set forth for illustrative purposes, but it is to be understood that other modifications of the present invention can be made by skilled artisans in the related industry without departing from the spirit and scope of the invention.

EXAMPLES

An EO-RCL of Example 1 was evaluated in different brine systems (freshwater, NaCl saturated water, $CaBr_2$ and $ZnBr_2$/$CaBr_2$) at 2 pounds per barrel (ppb), corresponding to 0.57 wt %. Its performance was compared against that of standard high molecular weight HECs widely used in completion and workover fluids. Comparative Example 1 is a standard high molecular weight HEC (Natrosol® HI-VIS HEC, available from Hercules Incorporated). Comparative Example 2 is also a standard high molecular weight HEC (Natrosol® 210HHW HEC, available from Hercules Incorporated). The viscosity and fluid loss properties were measured after static aging overnight at room temperature the results of this testing are found in Table 1.

TABLE 1

Comparative Rheology/Fluid Loss (FL) Performance of Various HECs and EO-RCL in Completion Fluids

| Fluid system | | | | | | Final | Aging | Final | OFITE Viscometer | | |
|---|---|---|---|---|---|---|---|---|---|---|---|
| Brine | S.G. | Density ppg | Sample Ref. | | MgO (ppb) | pH Bef. Ag. | Temp. (16 hrs) | pH Aft. Ag. | 600 rpm | 300 rpm | 200 rpm |
| | | | | ppb | | | | | | | |
| Demi-Water | 1 | 8.33 | Comp. Ex. 1 | 2 | 1 | 9.98 | 24.2 | 10.07 | 90 | 71 | 61 |
| | | | Comp Ex. 2 | 2 | 1 | 10.84 | 24.4 | 10.36 | 87 | 68 | 58 |
| | | | Ex. 1 | 2 | 1 | 10.55 | 24.6 | 10.35 | 88 | 71 | 61.5 |
| Salt Saturated (36% NaCl) | 1.2 | 10 | Comp. Ex. 1 | 2 | 1 | 9.73 | 24 | 10.18 | 109.5 | 83.5 | 71 |
| | | | Comp Ex. 2 | 2 | 1 | 9.98 | 24.3 | 9.93 | 108.5 | 82.5 | 69 |
| | | | Ex. 1 | 2 | 1 | 9.91 | 24.5 | 9.78 | 103 | 80 | 68 |
| 40% CaCl2 | 1.4 | 11.7 | Comp Ex. 2 | 2 | 1 | 8.09 | 24.2 | 7.84 | 241.5 | 181 | 154 |
| | | | Ex. 1 | 2 | 1 | 8.23 | 24.2 | 7.88 | 237 | 179 | 153.5 |
| CaBr2 | 1.74 | 14.5 | Comp. Ex. 1 | 2 | 1 | 7.36 | 24 | 7.65 | 97 | 65 | 52 |
| | | | Comp Ex. 2 | 2 | 1 | 7.13 | 24.9 | 7.02 | 140 | 96.5 | 78 |
| | | | Ex. 1 | 2 | 1 | 7.09 | 24.8 | 6.96 | 244 | 184 | 156.5 |
| ZnBr2/CaBr2 | 2.3 | 19.2 | Comp. Ex. 1 | | | Did not go in solution | | | | | |
| | | | Comp Ex. 2 | 2 | 1 | 0.93 | 23.5 | 0.85 | >330 | 267 | 222 |
| | | | Ex. 1 | 2 | 1 | 0.83 | 24.2 | 0.92 | >330 | 275 | 230 |

| Fluid system | | | OFITE Viscometer | | | | | | | | |
|---|---|---|---|---|---|---|---|---|---|---|---|
| Brine | S.G. | Density ppg | 100 rpm | 60 rpm | 30 rpm | 6 rpm | 3 rpm | A.V. cPs | P.V. cPs | Yv lb/100 ft2 | F.L. (ml) |
| Demi-Water | 1 | 8.33 | 47 | 38 | 28.5 | 12 | 8 | 45 | 19 | 52 | 31 |
| | | | 44 | 35 | 25 | 9.5 | 6.5 | 43.5 | 19 | 49 | 89 |
| | | | 48.5 | 40 | 30 | 13 | 9 | 44 | 17 | 54 | 67.2 |
| Salt Saturated (36% NaCl) | 1.2 | 10 | 52 | 41 | 28.5 | 10.5 | 7 | 54.75 | 26 | 57.5 | 31.2 |
| | | | 50 | 38.5 | 26 | 8.5 | 5.5 | 54.25 | 26 | 56.5 | 29 |
| | | | 51 | 41 | 29 | 11 | 7.5 | 51.5 | 23 | 57 | 30.2 |
| 40% CaCl2 | 1.4 | 11.7 | 118 | 97 | 73.5 | 35.5 | 24.5 | 120.75 | 60.5 | 120.5 | 32 |
| | | | 121 | 102 | 82 | 48 | 37 | 118.5 | 58 | 121 | 64.2 |
| CaBr2 | 1.74 | 14.5 | 35.5 | 26.5 | 18 | 7 | 4.5 | 48.5 | 32 | 33 | 13 |
| | | | 54 | 41 | 27.5 | 10.5 | 6.5 | 70 | 43.5 | 53 | 12.8 |
| | | | 121 | 99 | 76 | 36.5 | 25 | 122 | 60 | 124 | 17.7 |
| ZnBr2/CaBr2 | 2.3 | 19.2 | Did not go in solution | | | | | | | | |
| | | | 166 | 136.5 | 107 | 63 | 49.5 | — | — | — | 79.8 |
| | | | 175.5 | 146 | 117.5 | 74 | 60 | — | — | — | 105.4 |

It was found that the EO-RCL was more efficient than high molecular weight commercial HECs in viscosifying high density (heavy) brines as evident by the high apparent viscosities (A. V.) and yield values (Yv) developed in these systems (FIG. 2). In the $ZnBr_2$/$CaBr_2$ brine, characterized by an extremely low pH, Comparative Example 1 (Natrosol® HI-VIS HEC) did not simply go into solution.

In low to medium density brines, the performances of EO-RCL were equivalent to those of high molecular weight commercial HECs (FIG. 1).

Data in FIG. 3 indicate that fluid of Example 1 containing EO-RCL develops a more regular viscosity profile at high shear rate ($510\ s^{-1}$) than the fluid of Comparative Example 2 containing an commercial HEC with a significant improvement of viscosity for brine densities exceeding 12 ppg.

Interestingly, the fluid of Example 1 containing EO-RCL develops much higher low shear viscosity than fluid containing commercial HECs (FIG. 4). This feature is highly desired because it would provide greater carrying capacity during the completion and workover operations.

Although the invention has been described with reference to preferred embodiments, it is to be understood that variations and modifications in form and detail thereof may be made without departing from the spirit and scope of the claimed invention. Such variations and modifications are to be considered within the purview and scope of the claims appended hereto.

What is claimed:

1. A completion and workover fluid composition comprising water and at least one rheology modifier and/or fluid loss control agent, and at least one other ingredient selected from the group consisting of polymeric additive, inorganic salts, shale stabilizers, corrosion inhibitors, weighting agents, and finely divided clay particles wherein the rheology modifier and/or the fluid loss control agent is ethoxylated raw cotton linters (EO-RCL), wherein the EO-RCL has an oxyethylene molar substitution (MS) with a lower limit of about 0.5 and wherein the at least one other ingredient comprises an inorganic salt and wherein the inorganic salt is selected from the group consisting of calcium carbonate, calcium chloride, potassium chloride, sodium chloride, magnesium chloride, sodium bromide, potassium bromide, calcium bromide, zinc bromide, sodium formate, potassium formate, cesium formate and mixtures thereof.

2. The composition of claim 1, wherein the EO-RCL contains an additional substituent.

3. The composition of claim 2 wherein the additional substituent comprises alkyl groups.

4. The composition of claim 3 wherein the alkyl groups contain 1 to 30 carbon atoms.

5. The composition of claim 3 wherein the additional substituent comprises carboxymethyl groups.

6. The completion and workover fluid composition of claim 1, wherein the EO-RCL has an oxyethylene molar substitution (MS) with a lower limit of about 1.5.

7. The completion and workover fluid composition of claim 1, wherein the EO-RCL has an oxyethylene molar substitution (MS) with a lower limit of about 1.8.

8. The completion and workover fluid composition of claim 1, wherein the EO-RCL has an oxyethylene molar substitution (MS) with an upper limit of about 3.5.

9. The completion and workover fluid composition of claim 8, wherein the EO-RCL has an oxyethylene molar substitution (MS) with an upper limit of about 2.5.

10. The completion and workover fluid composition of claim 9, wherein the EO-RCL has an oxyethylene molar substitution (MS) with an upper limit of about 2.2.

11. The completion and workover fluid composition of claim 1, wherein the EO-RCL has an oxyethylene molar substitution (MS) in a range of from about 0.5 to about 3.5.

12. The completion and workover fluid composition of claim 11, wherein the EO-RCL has an oxyethylene molar substitution (MS) in a range of from about 1.5 to 2.5.

13. The completion and workover fluid composition of claim 12, wherein the EO-RCL has an oxyethylene molar substitution (MS) in a range of from about 1.8 to 2.2.

14. The completion and workover fluid composition of claim 1, wherein the composition further comprises a polymeric additive and wherein the polymeric additive is selected from the group consisting of starch and its derivatives, guar gum and its derivatives, xanthan gum, welan gum, diutan gum, cellulose ethers, polyacrylates, polyacrylamides and mixtures thereof.

15. The completion and workover fluid composition of claim 1, wherein the composition further comprises a shale stabilizer or corrosion inhibitor and wherein the shale stabilizer or corrosion inhibitor is selected from the group consisting of partially hydrolyzed polyacrylamides (PHPA), potassium chloride, potassium acetate, potassium carbonate, potassium hydroxide, sulfonated asphalt, blown asphalt, gilsonite, polyglycols, polyamino acids, surfactants, cationic polymers, mixed metal hydroxides (MMH), and mixtures thereof.

16. The completion and workover fluid composition of claim 1, wherein the composition further comprises a weighting agent and wherein the weighting agent is selected from the group consisting of barite, hematite, manganese oxide, sized calcium carbonate made from ground limestone or marble, and mixtures thereof.

17. The completion and workover fluid composition of claim 1, wherein the composition further comprises finely divided clay particles and wherein the finely divided clay particles are selected from the group consisting of bentonite, attapulgite, sepiolite, saponite, and mixtures thereof.

18. The completion and workover fluid composition of claim 1, wherein the composition further comprises a lubricant and wherein the lubricant is selected from the group consisting of glycol, asphalt, and mixtures thereof.

19. The completion and workover fluid composition of claim 1, further comprising a biocide.

20. The completion and workover fluid composition of claim 1, further comprising a defoamer.

* * * * *